US012670206B2

(12) United States Patent
Lutz

(10) Patent No.: US 12,670,206 B2
(45) Date of Patent: Jun. 30, 2026

(54) TEMPORAL COPY USING EMBEDDING CONTENT DATABASE

(71) Applicant: Microsoft Technology Licensing, LLC, Redmond, WA (US)

(72) Inventor: Moshe R. Lutz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 18/196,366

(22) Filed: May 11, 2023

(65) Prior Publication Data

US 2024/0289378 A1 Aug. 29, 2024

Related U.S. Application Data

(60) Provisional application No. 63/448,863, filed on Feb. 28, 2023.

(51) Int. Cl.
*G06F 16/435* (2019.01)
*G06F 16/41* (2019.01)

(52) U.S. Cl.
CPC ............ *G06F 16/435* (2019.01); *G06F 16/41* (2019.01)

(58) Field of Classification Search
None
See application file for complete search history.

(56) References Cited

U.S. PATENT DOCUMENTS

| | | | |
|---|---|---|---|
| 2006/0050996 A1* | 3/2006 | King | G06Q 30/0207 |
| | | | 707/E17.085 |
| 2018/0189634 A1* | 7/2018 | Abdelaziz | G06N 3/04 |
| 2021/0089571 A1 | 3/2021 | Perone | |
| 2022/0383153 A1* | 12/2022 | Mahmoud | G06N 5/02 |

OTHER PUBLICATIONS

CHU., et al., "Multimodal Retrieval through Relations between Subjects and Objects in Lifelog Images", Proceedings of the 33rd Annual ACM, Symposium on User Interface Software and Technology, Jun. 9, 2020, pp. 51-55.
International Search Report and Written Opinion received for PCT Application No. PCT/US2023/086513, May 10, 2024, 14 pages.

* cited by examiner

*Primary Examiner* — Taelor Kim
(74) *Attorney, Agent, or Firm* — Alleman Hall LLP

(57) ABSTRACT

Systems and methods for generating a design difference caption are provided. In particular, a computing device may receive a capture request to capture a content item, capture the content item with metadata associated with the content item, and generate one or more semantic embeddings of content data using one or more semantic models. The content data may include the content item and the metadata. The computing device may further store the one or more semantic embeddings in a content database, provide captured content history stored in the content database, the capture content history including a list of captured content items, receive a user query to search the captured content history; and provide search results based on the user query.

17 Claims, 8 Drawing Sheets

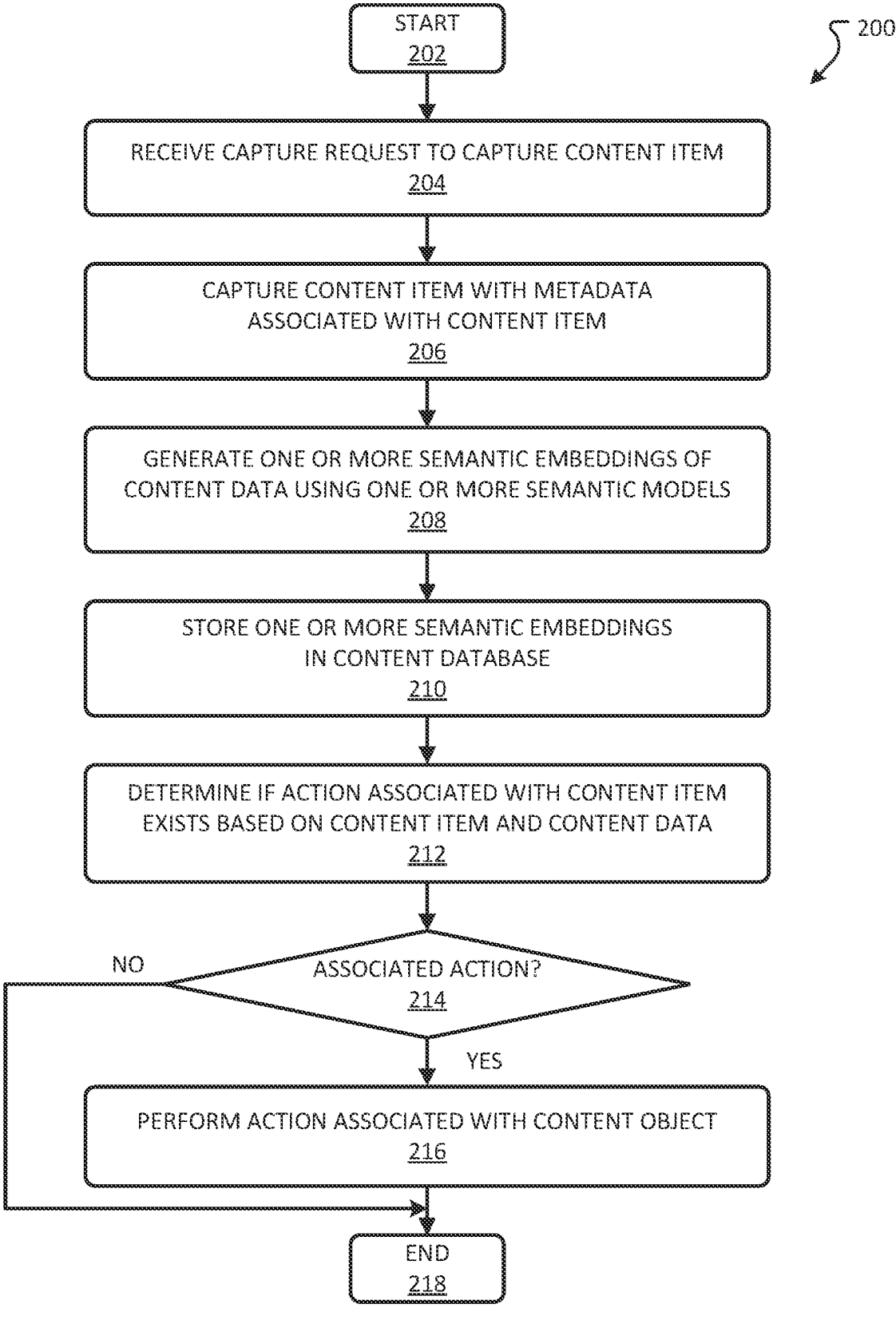

START
202

RECEIVE CAPTURE REQUEST TO CAPTURE CONTENT ITEM
204

CAPTURE CONTENT ITEM WITH METADATA
ASSOCIATED WITH CONTENT ITEM
206

GENERATE ONE OR MORE SEMANTIC EMBEDDINGS OF
CONTENT DATA USING ONE OR MORE SEMANTIC MODELS
208

STORE ONE OR MORE SEMANTIC EMBEDDINGS
IN CONTENT DATABASE
210

DETERMINE IF ACTION ASSOCIATED WITH CONTENT ITEM
EXISTS BASED ON CONTENT ITEM AND CONTENT DATA
212

NO     ASSOCIATED ACTION?
214

YES

PERFORM ACTION ASSOCIATED WITH CONTENT OBJECT
216

END
218

*Fig. 2*

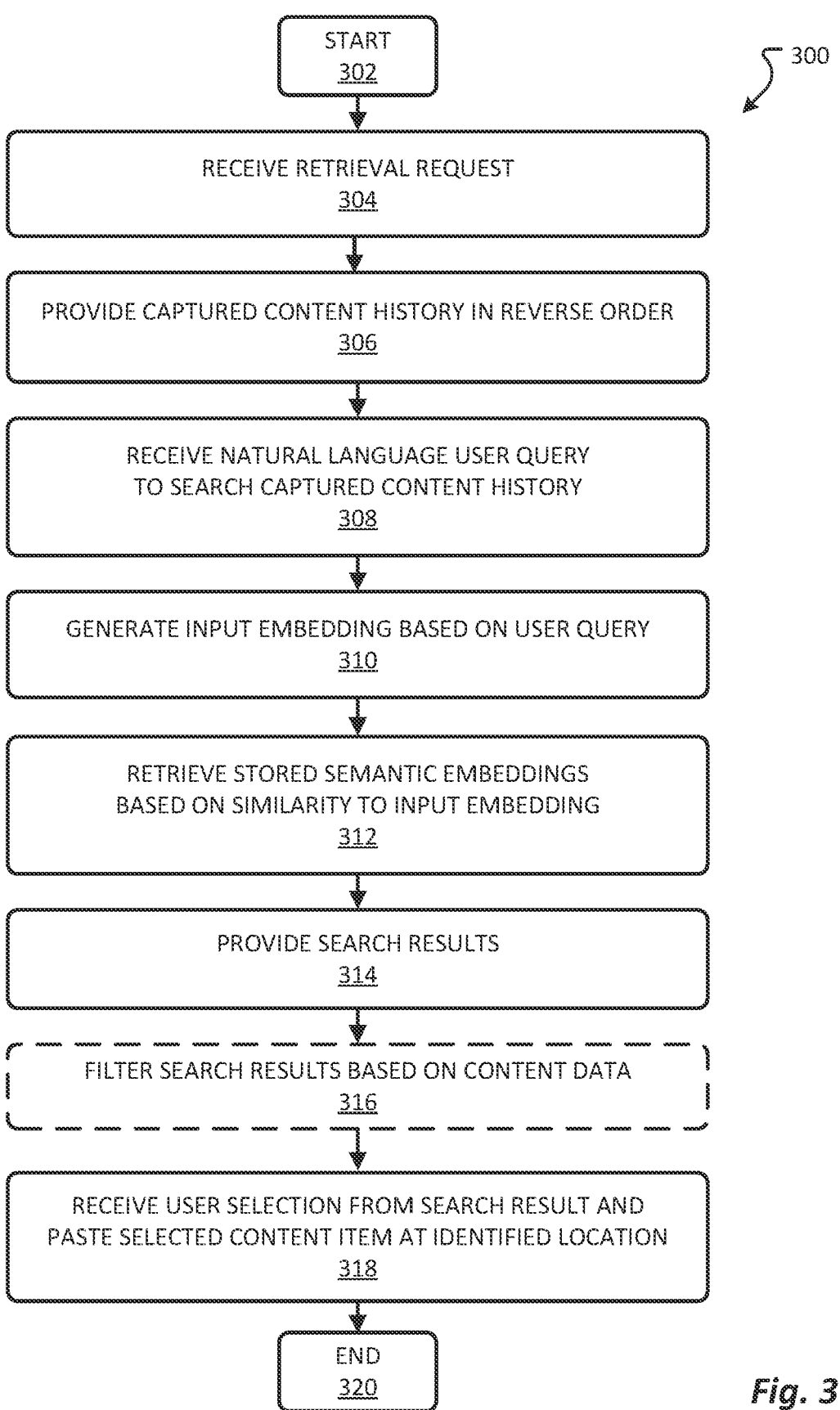

300

START
302

RECEIVE RETRIEVAL REQUEST
304

PROVIDE CAPTURED CONTENT HISTORY IN REVERSE ORDER
306

RECEIVE NATURAL LANGUAGE USER QUERY
TO SEARCH CAPTURED CONTENT HISTORY
308

GENERATE INPUT EMBEDDING BASED ON USER QUERY
310

RETRIEVE STORED SEMANTIC EMBEDDINGS
BASED ON SIMILARITY TO INPUT EMBEDDING
312

PROVIDE SEARCH RESULTS
314

FILTER SEARCH RESULTS BASED ON CONTENT DATA
316

RECEIVE USER SELECTION FROM SEARCH RESULT AND
PASTE SELECTED CONTENT ITEM AT IDENTIFIED LOCATION
318

END
320

Fig. 3

TEMPORAL COPY USING EMBEDDING CONTENT DATABASE

CROSS-REFERENCE TO RELATED APPLICATION

This application claims priority to U.S. Provisional Application No. 63/448,863, titled "TEMPORAL COPY USING EMBEDDING CONTENT DATABASE," filed on Feb. 28, 2023, the entire disclosure of which is hereby incorporated by reference in its entirety.

BACKGROUND

Computing devices include a variety of productivity tools and information that facilitate the accomplishment of a variety of tasks, including copying and pasting content items between different devices and applications. For example, a clipboard tool allows users to copy and store content items (e.g., image and text) from an original location and paste the copied content items to a new location. The clipboard may further provide a clipboard history where the users can scroll back through stored content items to select any of the previously stored content items. Additionally, the clipboard may allow the users to pin frequently used content item to continue to keep it from being removed from the clipboard history and to appear at the top of the clipboard history for easy access. However, as the clipboard history grows over time, it may be challenging for the users to find a particular content item from a long list of previously stored content items.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, a content management tool provides capturing, storing, and retrieving content items between different devices and applications. The content items are captured with corresponding metadata associated with the content items. One or more semantic embeddings associated with the content items are generated using one or more semantic embedding models based on the content items and the associated metadata and are stored in a content database. The content management tool allows users to retrieve a content item from previously captured content items using a natural language query.

In accordance with at least one example of the present disclosure, a method for capturing content items into a content database is provided. The method may include receiving a capture request to capture a content item, capturing the content item with metadata associated with the content item and generating one or more semantic embeddings of content data using one or more semantic models. The content data may include the content item and the metadata. The method may further include storing the one or more semantic embeddings in a content database and providing captured content history stored in the content database. The capture content history may include a list of captured content items. The method may further include receiving a user query to search the captured content history and providing search results based on the user query.

In accordance with at least one example of the present disclosure, a computing device for generating a design difference caption is provided. The computing device may include a processor and a memory having a plurality of instructions stored thereon that, when executed by the processor, causes the computing device to receive a capture request to capture a content item, capture the content item with metadata associated with the content item, generate one or more semantic embeddings of content data using one or more semantic models, the content data including the content item and the metadata, store the one or more semantic embeddings in a content database, provide captured content history stored in the content database, the capture content history including a list of captured content items, receive a user query to search the captured content history, and provide search results based on the user query.

In accordance with at least one example of the present disclosure, a non-transitory computer-readable medium storing instructions for generating a design difference caption is provided. The instructions when executed by one or more processors of a computing device, cause the computing device to receive a capture request to capture a content item, capture the content item with metadata associated with the content item, generate one or more semantic embeddings of content data using one or more semantic models, the content data including the content item and the metadata, store the one or more semantic embeddings in a content database, provide captured content history stored in the content database, the capture content history including a list of captured content items, receive a user query to search the captured content history, and provide search results based on the user query.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIG. 2 depicts a flowchart of an example method of capturing content items into a semantic content database using a clipboard in accordance with examples of the present disclosure;

FIG. 3 depicts a flowchart of an example method of retrieving content items from the semantic content database using the clipboard in accordance with examples of the present disclosure;

DETAILED DESCRIPTION

Figure 1:
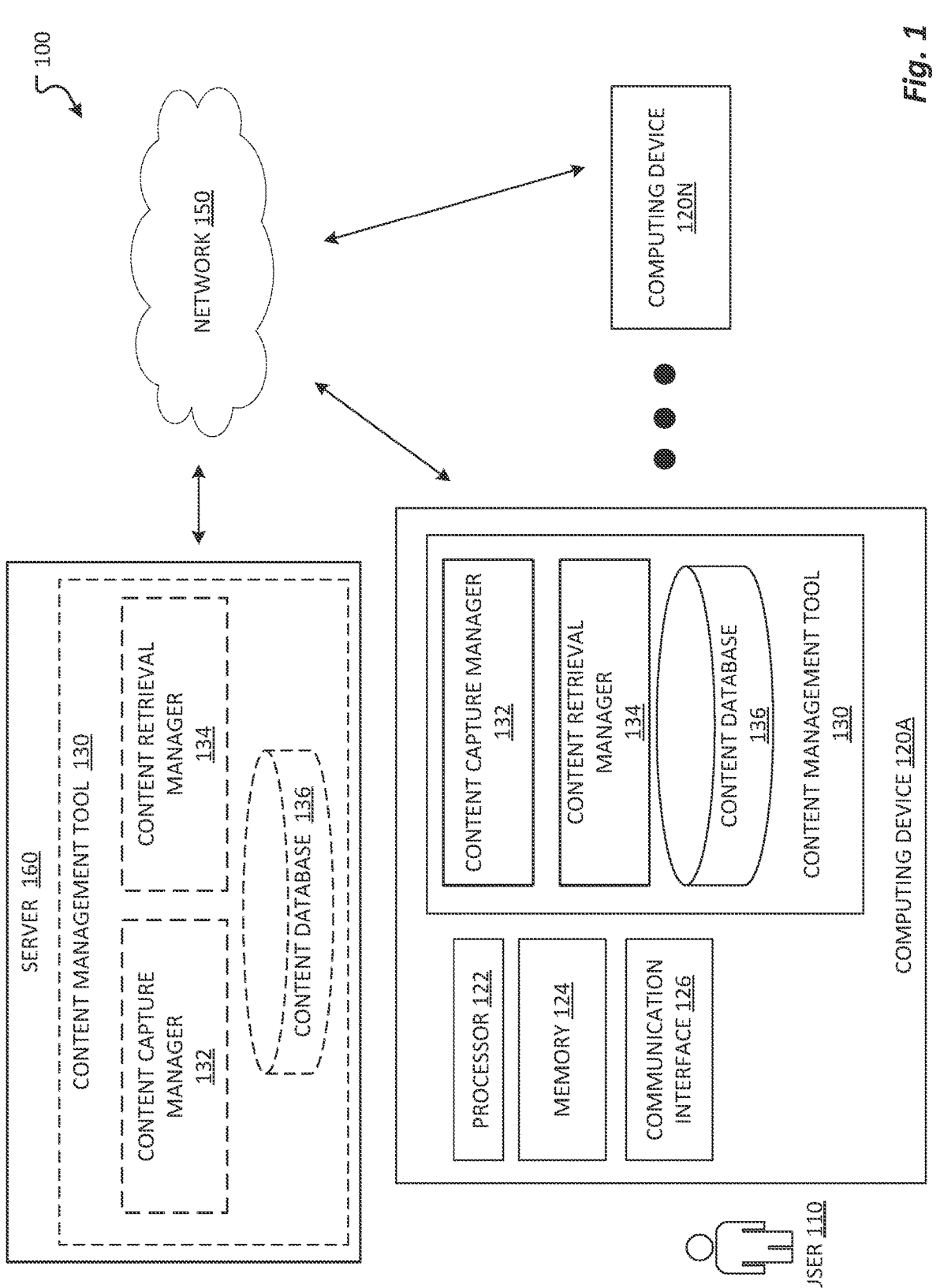
FIG. 1 depicts a block diagram of an example of an operating environment in which a content management tool may be implemented in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Computing devices include a variety of productivity tools and information that facilitate the accomplishment of a variety of tasks, including copying and pasting content items between different devices and applications. For example, a clipboard tool allows users to copy and temporarily store content items from an original location and paste the copied content items to a new location. The clipboard may further provide a clipboard history where the users can scroll back through stored content items to select any of the previously captured content items. Additionally, the clipboard may allow the users to pin frequently used content item to continue to keep it from being removed from the clipboard history and to appear at the top of the clipboard history for easy access. However, as the clipboard history grows over time, it may be challenging for the users to find a particular content item from a long list of previously captured content items.

In accordance with examples of the present disclosure, a content management tool provides capturing, storing, and retrieving content items between different devices and applications. When content item is captured, metadata associated with the content item is also determined and stored in a content database. For example, the content item may include texts, documents, photos, videos, and audios, and the metadata may include a date and time when the content item was captured, a type of the captured content item, a file name and a path of a file associated with the captured content item, a computing device used to capture the content item, a location of the computing device where the content item was captured, an application used to capture the content item, and any information extracted from the content item. It should be appreciated that a term "content data" is used throughout the present application to collectively refer to the content items and metadata associated with the content items.

The content management tool further allows users to view a captured content history of previously captured content items. The content management tool allows the users to filter and/or search the captured content history based on the content data. To do so, the user may search the list of the previously captured content items using a natural language query and further filter the search results based on the content data. For example, the user may indicate that the user is looking for information about a dog that may have been copied two months ago. The content management tool may provide search results including a list of captured content items related to dogs that have been captured during a certain time range (e.g., ±3 days) from the date two months ago from the search date. Additionally, the user may further filter the search results to see the content items that were captured on a user's mobile device.

In some aspects, the users may search the captured content history using keywords, which require iterating through each content item from the large quantities of content history to find which content item is related to the keywords. However, storing and retrieving content items from large quantities of content information may be computationally inefficient, such as by requiring a relatively large amount of memory to store the content items that is to be searched upon. Additionally, keyword searches may not consider the abstract meaning behind content items, and the search results may therefore be relatively inaccurate or incomplete.

In accordance with examples of the present disclosure, a content management tool extracts abstract meaning from content data in the form of embeddings that can be mathematically compared against the abstract meaning of other content data in the form of embeddings, such that a quantitative similarity between the embeddings, and by consequence the content data from which the embeddings were generated, can be determined. A similarity between content data can provide semantic context to a computing device when determining if an action should be performed and/or what action should be performed.

The content data is further provided to one or more semantic embedding models that generate one or more semantic embeddings, for example, using a generative large language machine learning model, a transformer model, other type of machine learning models, or a combination of models. The one or more semantic embeddings may then be inserted in an embedding object memory or content database. The semantic embeddings may be associated with respective indications corresponding to a reference to content data associated with the semantic embeddings. Further, the insertion may trigger a spatial storage operation to store a vector representation of the one or more semantic embeddings. After the embeddings are stored, a plurality of collections of stored embeddings may be received from the content database, such as based on a user input. Further, an action may be determined based on a subset of the collections of stored embeddings and the user input. The subset of the collections of stored embeddings may be retrieved based on a similarity to the input embedding.

FIG. 1 depicts a block diagram of an example of an operating environment 100 in which a content management tool may be implemented in accordance with examples of the present disclosure. To do so, the operating environment 100 includes a computing device 120 associated with the user 110. The operating environment 100 may further include one or more remote devices, such as a productivity platform server 160, that are communicatively coupled to the computing device 120 via a network 150. The network 150 may include any kind of computing network including, without limitation, a wired or wireless local area network (LAN), a wired or wireless wide area network (WAN), and/or the Internet.

The computing device 120 includes a content management tool 130 executing on a computing device 120 having a processor 122, a memory 124, and a communication interface 126. The content management tool 130 allows the user 110 to copy-and-paste or capture-and-retrieve content items. For example, the content management tool 130 may be a clipboard or any other productivity tool executed on the computing device 120 that has copy-and-paste or capture-and-retrieve functionality. The content item may be one or more texts, documents, images, pictures, photos, videos, or audios. Additionally, the computing device 120 may be, but is not limited to, a computer, a notebook, a laptop, a mobile device, a smartphone, a tablet, a portable device, a wearable device, or any other suitable computing device that is capable of executing the content management tool 130. To do so, the content management tool 130 further includes a content capture manager 132 and a content retrieval manager 134.

The content capture manger 132 is configured to capture content items into a semantic content database 136. The user may capture any content item that the user may want to retrieve or remember in the future. To do so, the content capture manger 132 is configured to receive a capture request to capture a content item to be saved in a content database 136. The capture request is any indicator that represents a user intent to capture or remember the content item for future retrieval or access. The capture request may be a shortcut and/or a gesture assigned by an operating system or by a user. For example, a keyboard shortcut for a content capture (e.g., Ctrl+r or Window logo key+r) may be predefined by an operating system of a user's computing device. Additionally or alternatively, a user may assign a gesture as a capture request. For example, a user may indicate that whenever the user takes a screenshot on the user's mobile device, the user wants the screenshot content item to be stored in the content database 136. In other example, the user may indicate that whenever the user takes a photo of a dog, the user wants the photo content item to be stored in the content database 136. In other words, the user may define one or more rules or action-based-rules as the capture request for capturing and storing content items in the content database 136. It should be appreciated that the content database 136 is synchronized between multiple devices of the user, such that the user can capture content items from any of the user's computing devices. However, it should be appreciated that, in some aspects, the content database may be a cloud-based content database that is shared between the multiple devices of the user.

The content capture manger 132 is further configured to capture the content item with metadata associated with the content item (collectively referred to as "the content data" throughout the present application). The content data may include the original content item, the date and time when the content item was captured, a type of the captured content item, a file name and/or a path of the folder or file associated with the captured content item, a computing device used to capture the content item, a location of the computing device where the content item was captured, an application used to capture the content item. Additionally, the content data may further include any information that was extracted from the content item.

The content capture manger 132 is configured to provide the content data to one or more semantic models to generate one or more semantic embeddings. In examples, the semantic models may be a generative large language machine learning model, a transformer model, etc. or a combination of machine learning models. The one or more semantic models may include one or more semantic embedding models, one or more generative large language models, and one or more machine-learning models. The content capture manger 132 is configured to extract abstract meaning from the content data in the form of one or more semantic embeddings. As described further below in FIG. 3, the semantic embeddings of content items are used to find and retrieve one or more stored content items from all previously captured content items in response to a user query (e.g., a natural language query from a user).

Depending on resources, capabilities, and capacity of the computing device used to capture the content item, the one or more sematic embeddings may be generated from the computing device or the server 160. For example, if the user captures a content item on a user's laptop computer, the content manager tool 130 on the user's laptop computer generates the semantic embeddings associated with the captured content item. If, however, the user captures a content item on a user's mobile device, which has less resources to perform semantic analysis, the content capture manger 132 sends the captured content data to the server 160 to generate the semantic embeddings associated with the captured content data. The semantic embeddings are then sent back to the user's mobile device to be inserted in the content database.

The content capture manger 132 is configured to store or insert one or more semantic embeddings in the content database 136. The semantic embeddings may be associated with respective indications corresponding to a reference to content data associated with the semantic embeddings. Further, the insertion may trigger a spatial storage operation to store a vector representation of the one or more semantic embeddings. As described above, after the semantic embeddings are stored, a plurality of collections of stored embeddings may be received from the content database, such as based on a user query. Further, an action may be determined based on a subset of the collections of stored embeddings and the user query. The subset of the collections of stored embeddings may be retrieved based on a similarity to the user query embedding.

Additionally, the content capture manger 132 is further configured to determine if an action is associated with the content item based on the content data and/or the capture request used to capture the content item. For example, a user may set a rule indicating that whenever the user takes a screenshot of a recipe using the user's mobile device, the user wants to store the screenshot content item in the content database and send an email with the screenshot content to a user's email. In other example, a user may set a rule indicating that whenever the user takes a photo of a dog using the user's mobile device, the user wants to store the photo content item in the content database and send a text message with the dog photo to a specific friend.

The content retrieval manager 134 is configured to retrieve previously captured content items from the content item database 136. To do so, the content retrieval manager 134 is configured to receive a retrieval request. The retrieval request may be a shortcut and/or a gesture assigned by an operating system or by a user. For example, a keyboard shortcut (e.g., Ctrl+v or Window logo key+v) may be predefined by an operating system of a user's computing device. Additionally or alternatively, a user may assign a shortcut or gesture as a retrieval request. In response to receiving the retrieval request, the content retrieval manager 134 is configured to provide a captured content history (i.e., a list of previously captured content items) in a reverse order. As described above, the content database is synchronized between multiple devices of the user, such that the user can retrieve the captured content items from any of the user's computing devices. However, it should be appreciated that, in some aspects, the content database may be a cloud-based content database that is shared between the multiple devices of the user.

The content retrieval manager 134 is further configured to receive a user query from the user to search the list of previously captured content items to retrieve one or more particular content items. The user query may be a natural language query. The content retrieval manager 134 is configured to generate an input embedding based on the user query using one or more semantic models (e.g., a semantic embedding model, a generative large language model, a machine-learning model, etc.) and retrieve one or more stored semantic embeddings based on the similarity to the input embedding.

For example, the content retrieval manager 134 is configured to generate, upon receiving a natural language query from a user, an input embedding that corresponds to the user query. The abstract meaning of the natural language query in the form of the input embedding is compared against the one or more semantic embeddings associated with the stored content items in the content database. By doing so, the content retrieval manager 134 may be configured to determine the content data from which the embeddings were generated by measuring a quantitative similarity between the stored semantic embeddings and the input embedding. A similarity between the content data and the natural language query can provide semantic context to a computing device when determining if an action should be performed and/or what action should be performed.

The content retrieval manager 134 is configured to provide search results to the user. Additionally, the content retrieval manager 134 is further configured to allow the user to further filter the search results. For example, the user may further filter the search results based on the content data, for example, a certain time range (e.g., last hour, last 24 hours, last 7 days, this month, and this year), information associated with the content item, a particular computing device used to capture the content item, a certain type of content item, and/or a particular application used to capture the content item. The user can further search the filtered list of the captured content history using a natural language query. The content retrieval manager 134 is further configured to allow the user to find and view a particular content item selected by the user from the search results and/or copy-and-paste it at a particular location indicated by the user.

Referring now to FIG. 2, a method 200 for capturing content items into a semantic content database in accordance with examples of the present disclosure is provided. A general order for the steps of the method 200 is shown in FIG. 2. Generally, the method 200 starts at 202 and ends at 218. The method 200 may include more or fewer steps or may arrange the order of the steps differently than those shown in FIG. 2. In the illustrative aspect, the method 200 is performed by a computing device (e.g., a user device 120) of a user 110. However, it should be appreciated that one or more steps of the method 200 may be performed by another device (e.g., a server 160).

Specifically, in some aspects, the method 200 may be performed by a content management tool (e.g., 130) executed on the user device 120. For example, the content management tool 130 may be a clipboard or any other productivity tool executed on the computing device 120 that has copy-and-paste or capture-and-retrieve functionality. For example, the computing device 120 may be, but is not limited to, a computer, a notebook, a laptop, a mobile device, a smartphone, a tablet, a portable device, a wearable device, or any other suitable computing device that is capable of executing a content management tool (e.g., 130). For example, the server 160 may be any suitable computing device that is capable of communicating with the computing device 120. The method 200 can be executed as a set of computer-executable instructions executed by a computer system and encoded or stored on a computer readable medium. Further, the method 200 can be performed by gates or circuits associated with a processor, Application Specific Integrated Circuit (ASIC), a field programmable gate array (FPGA), a system on chip (SOC), or other hardware device. Hereinafter, the method 200 shall be explained with reference to the systems, components, modules, software, data structures, user interfaces, etc. described in conjunction with FIG. 1 and FIGS. 4-7.

The method 200 starts at operation 202, where flow may proceed to 204. At operation 204, the content management tool 130 receives a capture request to capture a content item to be saved in a content database (e.g., 144). The capture request is any indicator that represents a user intent to capture or remember the content item for future retrieval or access. The content item may be one or more texts, documents, images, pictures, photos, videos, or audios. The capture request may be a shortcut and/or a gesture assigned by an operating system or by a user. For example, a keyboard shortcut for a content capture (e.g., Ctrl+r or Window logo key+r) may be predefined by an operating system of a user's computing device. Additionally, or alternatively, a user may assign a gesture as a capture request. For example, a user may indicate that whenever the user takes a screenshot on the user's mobile device, the user wants the screenshot content item to be stored in the content database.

At operation 206, the content management tool 130 captures the content item with metadata associated with the content item (collectively referred to as "the content data" throughout the present application). The content data may include the original content item, the date and time when the content item was captured, a type of the captured content item, a file name and/or a path of the folder or file associated with the captured content item, a computing device used to capture the content item, a location of the computing device where the content item was captured, an application used to capture the content item. Additionally, the content data may further include any information that was extracted from the content item.

For example, a user may have set the screenshot function on the user's mobile device as the capture request and may take a screenshot of a pizza recipe from a web browser application on a user's mobile device that the user wants to try it later. The content management tool 130 may then store the content item of the pizza recipe, including texts and photos, and determine content data associated with the pizza recipe content item. For example, the content management tool 130 may determine the date and time of the capture of the content item, the user's mobile device as the device being used to capture the content item, and the web browser application as the application being used to capture the content item. Additionally, the content management tool 130 may further process the photos to extract meaningful information, such as ingredients shown in the photos, to be stored in the content database.

At operation 208, the content management tool 130 generates one or more semantic embeddings using one or more semantic models (e.g., a semantic embedding model, a generative large language model, a machine-learning model, etc.). To do so, the content data is provided to one or more semantic models that generate one or more semantic embeddings. The content management tool 130 extracts abstract meaning from the content data in the form of one or more semantic embeddings. As described further below in FIG. 3, the semantic embeddings of content items are used to find and retrieve one or more stored content items from all previously captured content items in response to a user query (e.g., a natural language query from a user).

As described above, the content database is synchronized between multiple devices of the user, such that the user can capture content items from any of the user's computing devices. Depending on resources, capability, and capacity of the computing device, the one or more sematic embeddings may be generated from the computing device and/or a server (e.g., 160) that includes the one or more semantic models. For example, if the user captures a content item on a user's laptop computer, the content manager tool 130 on the user's laptop computer generates the semantic embeddings associated with the captured content item. If, however, the user captures a content item on a user's mobile device, which has less capability to perform semantic analysis, the captured content item is sent to a server (e.g., 160) to generate the semantic embeddings associated with the captured content item. The semantic embeddings are then sent back to the user's mobile device to be inserted in the content database.

Subsequently, at operation 210, the content management tool 130 stores or inserts one or more semantic embeddings in the content database. The semantic embeddings may be associated with respective indications corresponding to a reference to content data associated with the semantic embeddings. Further, the insertion may trigger a spatial storage operation to store a vector representation of the one or more semantic embeddings. As described above, after the semantic embeddings are stored, a plurality of collections of stored embeddings may be received from the content database, such as based on a user query. Further, an action may be determined based on a subset of the collections of stored embeddings and the user query. The subset of the collections of stored embeddings may be retrieved based on a similarity to the user query embedding.

Subsequently or simultaneously, at operation 212, the content management tool 130 determines if an action is associated with the content item based on the content item and the content data. In some aspects, the content management tool 130 determines if an action is associated with the content item based the capture request used to capture the content item. If the content management tool 130 determines that there is no action associated with the content item, the method 200 may end at operation 218.

If, however, the content management tool 130 determines that there is an action associated with the content item, the method 200 advances to operation 216 to perform the associated action. For example, a user may set a rule indicating that whenever the user takes a screenshot of a recipe using the user's mobile device, the user wants to store the screenshot content item in the content database and send an email with the screenshot content to a user's email.

In other example, a user may set a rule indicating that whenever the user takes a photo of a dog using the user's mobile device, the user wants to store the photo content item in the content database and send a text message with the dog photo to a specific friend. Subsequently, the method 200 may end at operation 218.

Referring now to FIG. 3, a method 300 for retrieving content items from content item database in accordance with examples of the present disclosure is provided. A general order for the steps of the method 300 is shown in FIG. 3. Generally, the method 300 starts at 302 and ends at 320. The method 300 may include more or fewer steps or may arrange the order of the steps differently than those shown in FIG. 3. In the illustrative aspect, the method 300 is performed by a computing device (e.g., a user device 120) of a user 110. However, it should be appreciated that one or more steps of the method 300 may be performed by another device (e.g., a server 160).

Specifically, in some aspects, the method 300 may be performed by a content management tool (e.g., 130) executed on the user device 120. For example, the content management tool 130 may be a clipboard or any other productivity tool executed on the computing device 120 that has copy-and-paste or capture-and-retrieve functionality. For example, the computing device 120 may be, but is not limited to, a computer, a notebook, a laptop, a mobile device, a smartphone, a tablet, a portable device, a wearable device, or any other suitable computing device that is capable of executing a content management tool (e.g., 130). For example, the server 160 may be any suitable computing device that is capable of communicating with the computing device 120. The method 300 can be executed as a set of computer-executable instructions executed by a computer system and encoded or stored on a computer readable medium. Further, the method 300 can be performed by gates or circuits associated with a processor, Application Specific Integrated Circuit (ASIC), a field programmable gate array (FPGA), a system on chip (SOC), or other hardware device. Hereinafter, the method 300 shall be explained with reference to the systems, components, modules, software, data structures, user interfaces, etc. described in conjunction with FIG. 1 and FIGS. 4-7.

The method 300 starts at operation 302, where flow may proceed to 304. At operation 304, the content management tool 130 receives a retrieval request. The retrieval request may be a shortcut and/or a gesture assigned by an operating system or by a user. For example, a keyboard shortcut (e.g., Ctrl+v or Window logo key+v) may be predefined by an operating system of a user's computing device. Additionally, or alternatively, a user may assign a shortcut or gesture as a retrieval request. In response to receiving the retrieval request, at operation 306, the content management tool 130 provides a captured content history (i.e., a list of previously captured content items) in a reverse order. As described above, the content database is synchronized between different devices of the user, such that the user can retrieve the captured content items from any of the user's computing devices. However, it should be appreciated that, in some aspects, the content database may be a cloud-based content database that is shared between the multiple devices of the user.

The user can further search the captured content history to retrieve one or more particular content items. To do so, at operation 308, the content management tool 130 receives a user query from the user to search the captured content history. The user query may be a natural language query. For example, the user may say "I want to find a recipe that I think I saved two months ago." It should be appreciated that, in some aspects, the method 300 may receive a retrieval request at operation 304 and skips ahead to operation 308 to receive a user query (e.g., by providing a search bar for the user to enter a user query or by listening for an audible user query).

At operation 310, the content management tool 130 generates an input embedding based on the user query using one or more semantic models (e.g., a semantic embedding model, a generative large language model, a machine-learning model, etc.). At operation 312, the content management tool 130 retrieves one or more stored semantic embeddings based on the similarity to the input embedding. For example, when a user submits a natural language query, the content management tool 130 may generate an input embedding that corresponds to the user query. The abstract meaning of the natural language query in the form of the input embedding is compared against the one or more semantic embeddings associated with the stored content items in the content database. By doing so, the content management tool 130 may determine the content data from which the embeddings were generated by measuring a quantitative similarity between the stored semantic embeddings and the input embedding. A similarity between the content data and the natural language query can provide semantic context to a computing device when determining if an action should be performed and/or what action should be performed.

At operation 314, the content management tool 130 provides the search results. Additionally, the user may further filter the search results at operation 316. For example, the search results may be filtered based on the content data. For example, the user may further filter the search results by information associated with the content item, by a particular computing device that was used to capture the content item, by a certain type of content items, and/or a particular application that was used to capture the content item.

In the example provided above, the user may query the content management tool 130 to find a recipe that the user captured about two months ago. The content manager tool 130 may provide search results with all the recipes that have been captured within ±3 days from the date two months ago from the query date. The user may further filter the search results to show one or more recipes with chicken, which were captured on the user's mobile device by taking a screenshot image.

At operation 318, the user may select a particular content item from the search results. The content management tool 130 copies the selected content item and paste it at an identified location indicated by the user. However, it should be appreciated that, in some aspects, the user may retrieve and view the particular content item from the search results and not necessarily copy it into another location.

Figure 4A:
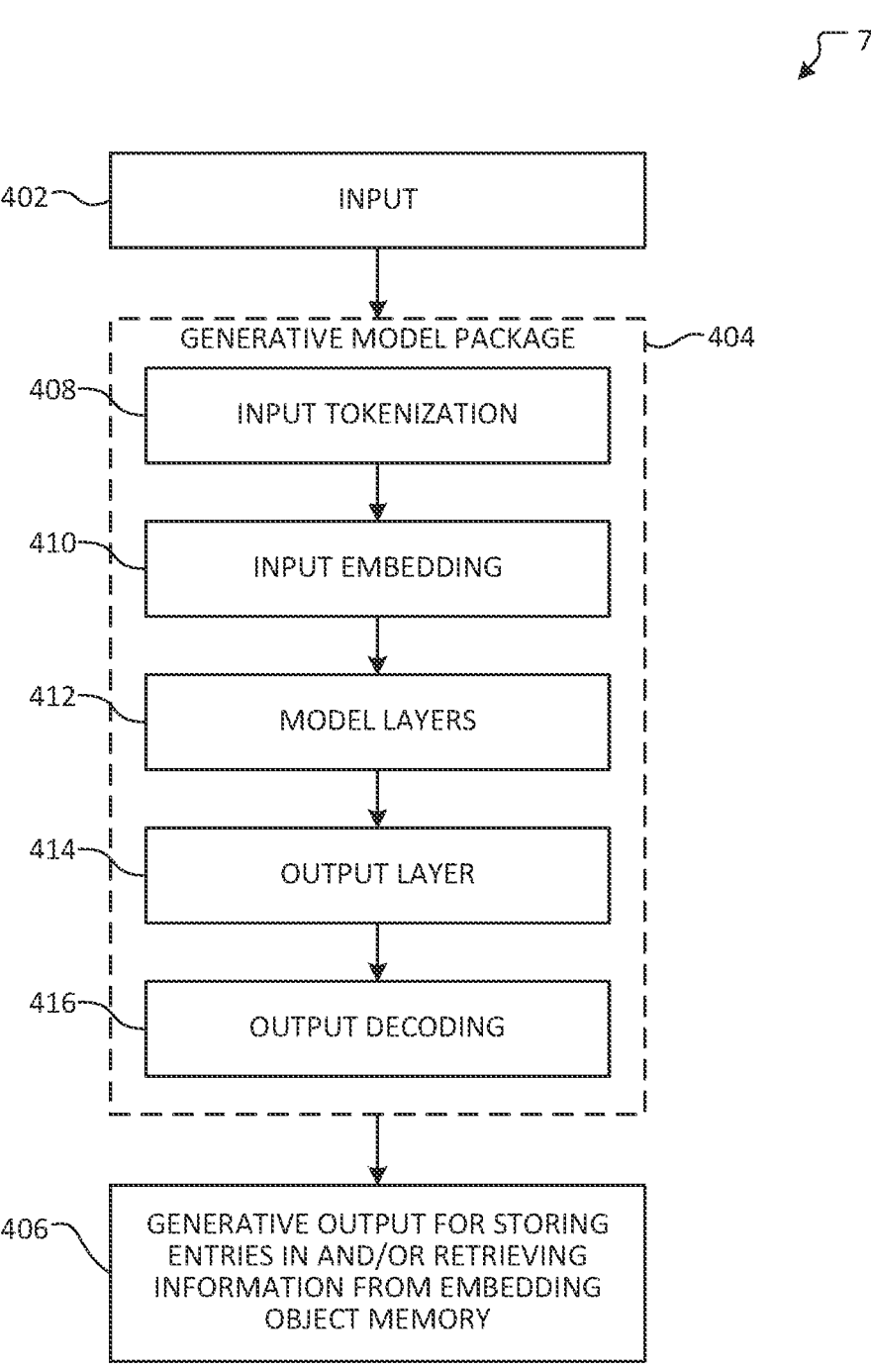
FIGS. 4A and 4B illustrate overviews of an example generative machine learning model that may be used in accordance with examples of the present disclosure.
Figure 4B:
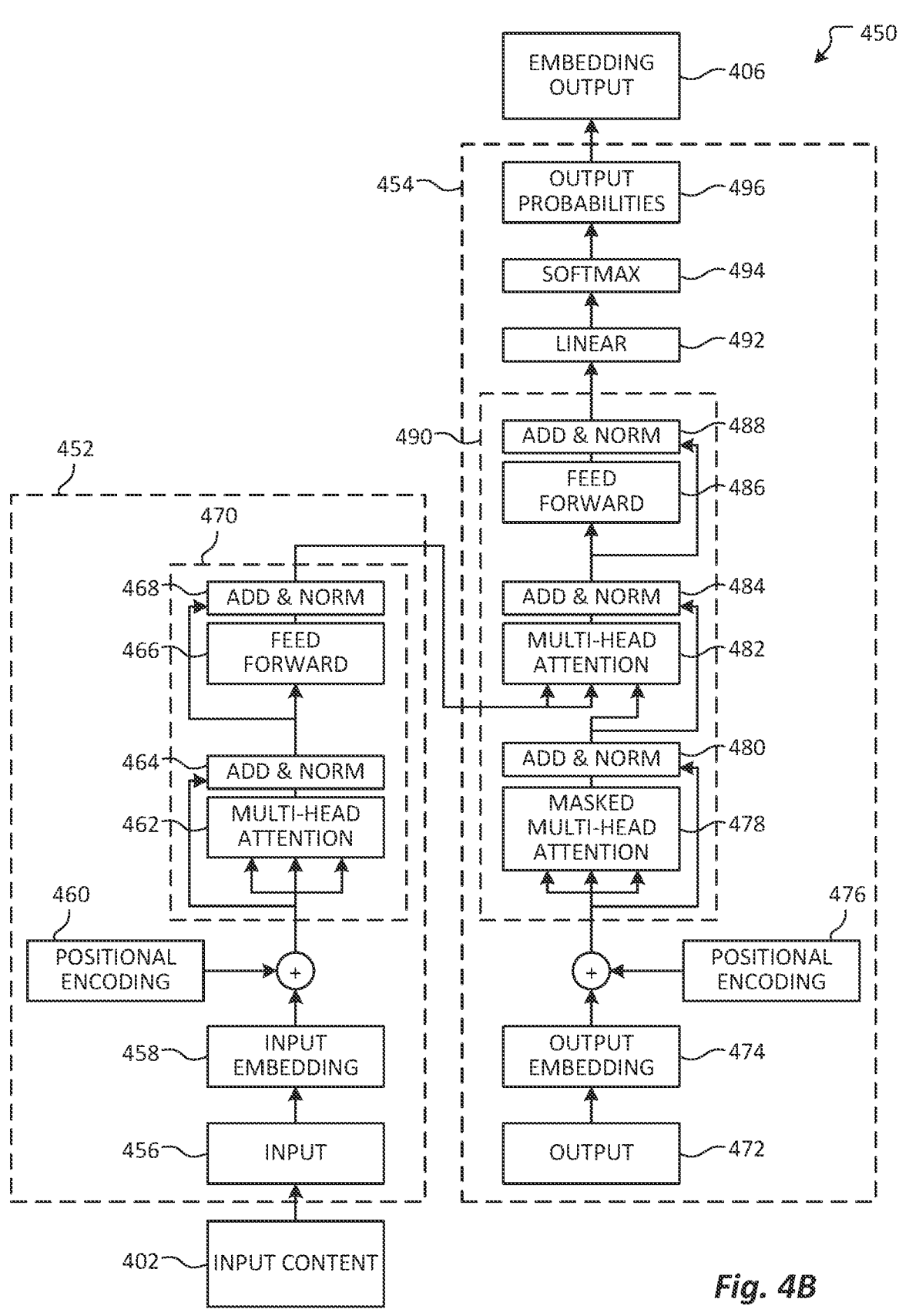

FIGS. 4A and 4B illustrate overviews of an example generative machine learning model that may be used according to aspects described herein. With reference first to FIG. 4A, conceptual diagram 400 depicts an overview of pre-trained generative model package 404 that processes an input 402 to generate model output for storing entries in and/or retrieving information from a generative model output 406 (e.g., suggestions and/or suggested modifications) according to aspects described herein.

In examples, generative model package 404 is pre-trained according to a variety of inputs (e.g., a variety of human languages, a variety of programming languages, and/or a variety of content types) and therefore need not be finetuned or trained for a specific scenario. Rather, generative model package 404 may be more generally pre-trained, such that input 402 includes a prompt that is generated, selected, or otherwise engineered to induce generative model package 404 to produce certain generative model output 406. It will be appreciated that input 402 and generative model output 406 may each include any of a variety of content types, including, but not limited to, text output, image output, audio output, video output, programmatic output, and/or binary output, among other examples. In examples, input 402 and generative model output 406 may have different content types, as may be the case when generative model package 404 includes a generative multimodal machine learning model.

As such, generative model package 404 may be used in any of a variety of scenarios and, further, a different generative model package may be used in place of generative model package 404 without substantially modifying other associated aspects (e.g., similar to those described herein with respect to FIGS. 1-3). Accordingly, generative model package 404 operates as a tool with which machine learning processing is performed, in which certain inputs 402 to generative model package 404 are programmatically generated or otherwise determined, thereby causing generative model package 404 to produce model output 406 that may subsequently be used for further processing.

Generative model package 404 may be provided or otherwise used according to any of a variety of paradigms. For example, generative model package 404 may be used local to a computing device (e.g., the computing device 140 in FIG. 1) or may be accessed remotely from a machine learning service (e.g., the server 160 in FIG. 1). In other examples, aspects of generative model package 404 are distributed across multiple computing devices. In some instances, generative model package 404 is accessible via an application programming interface (API), as may be provided by an operating system of the computing device and/or by the machine learning service, among other examples.

With reference now to the illustrated aspects of generative model package 404, generative model package 404 includes input tokenization 408, input embedding 410, model layers 412, output layer 414, and output decoding 416. In examples, input tokenization 408 processes input 402 to generate input embedding 410, which includes a sequence of symbol representations that corresponds to input 402. Accordingly, input embedding 410 is processed by model layers 412, output layer 414, and output decoding 416 to produce model output 406. An example architecture corresponding to generative model package 404 is depicted in FIG. 4B, which is discussed below in further detail. Even so, it will be appreciated that the architectures that are illustrated and described herein are not to be taken in a limiting sense and, in other examples, any of a variety of other architectures may be used.

FIG. 4B is a conceptual diagram that depicts an example architecture 450 of a pre-trained generative machine learning model that may be used according to aspects described herein. As noted above, any of a variety of alternative architectures and corresponding ML models may be used in other examples without departing from the aspects described herein.

As illustrated, architecture 450 processes input 402 to produce generative model output 406, aspects of which were discussed above with respect to FIG. 4A. Architecture 450 is depicted as a transformer model that includes encoder 452 and decoder 454. Encoder 452 processes input embedding 458 (aspects of which may be similar to input embedding 410 in FIG. 4A), which includes a sequence of symbol representations that corresponds to input 456. In examples, input 456 includes content data 402 corresponding to a content item.

Further, positional encoding 460 may introduce information about the relative and/or absolute position for tokens of input embedding 458. Similarly, output embedding 474 includes a sequence of symbol representations that correspond to output 472, while positional encoding 476 may similarly introduce information about the relative and/or absolute position for tokens of output embedding 474.

As illustrated, encoder 452 includes example layer 470. It will be appreciated that any number of such layers may be used, and that the depicted architecture is simplified for illustrative purposes. Example layer 470 includes two sub-layers: multi-head attention layer 462 and feed forward layer 466. In examples, a residual connection is included around each layer 462, 466, after which normalization layers 464 and 468, respectively, are included.

Decoder 454 includes example layer 490. Similar to encoder 452, any number of such layers may be used in other examples, and the depicted architecture of decoder 454 is simplified for illustrative purposes. As illustrated, example layer 490 includes three sub-layers: masked multi-head attention layer 478, multi-head attention layer 482, and feed forward layer 486. Aspects of multi-head attention layer 482 and feed forward layer 486 may be similar to those discussed above with respect to multi-head attention layer 462 and feed forward layer 466, respectively. Additionally, masked multi-head attention layer 478 performs multi-head attention over the output of encoder 452 (e.g., output 472). In examples, masked multi-head attention layer 478 prevents positions from attending to subsequent positions. Such masking, combined with offsetting the embeddings (e.g., by one position, as illustrated by multi-head attention layer 482), may ensure that a prediction for a given position depends on known output for one or more positions that are less than the given position. As illustrated, residual connections are also included around layers 478, 482, and 486, after which normalization layers 480, 484, and 488, respectively, are included.

Multi-head attention layers 462, 478, and 482 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 4B (e.g., by a corresponding normalization layer 464, 480, or 484).

Feed forward layers 466 and 486 may each be a fully connected feed-forward network, which applies to each position. In examples, feed forward layers 466 and 486 each include a plurality of linear transformations with a rectified linear unit activation in between. In examples, each linear transformation is the same across different positions, while different parameters may be used as compared to other linear transformations of the feed-forward network.

Additionally, aspects of linear transformation 492 may be similar to the linear transformations discussed above with respect to multi-head attention layers 462, 478, and 482, as well as feed forward layers 466 and 486. Softmax 494 may further convert the output of linear transformation 492 to predicted next-token probabilities, as indicated by output probabilities 496. It will be appreciated that the illustrated architecture is provided in as an example and, in other examples, any of a variety of other model architectures may be used in accordance with the disclosed aspects.

Accordingly, output probabilities 496 may thus form generative model output 406 according to aspects described herein, such that the output of the generative ML model (e.g., which may include one or more semantic embeddings and one or more retrieved content items) is used as input for determining an action according to aspects described herein. In other examples, generative model output 406 is provided as generated output for retrieving one or more previously captured content items.

Figure 5:
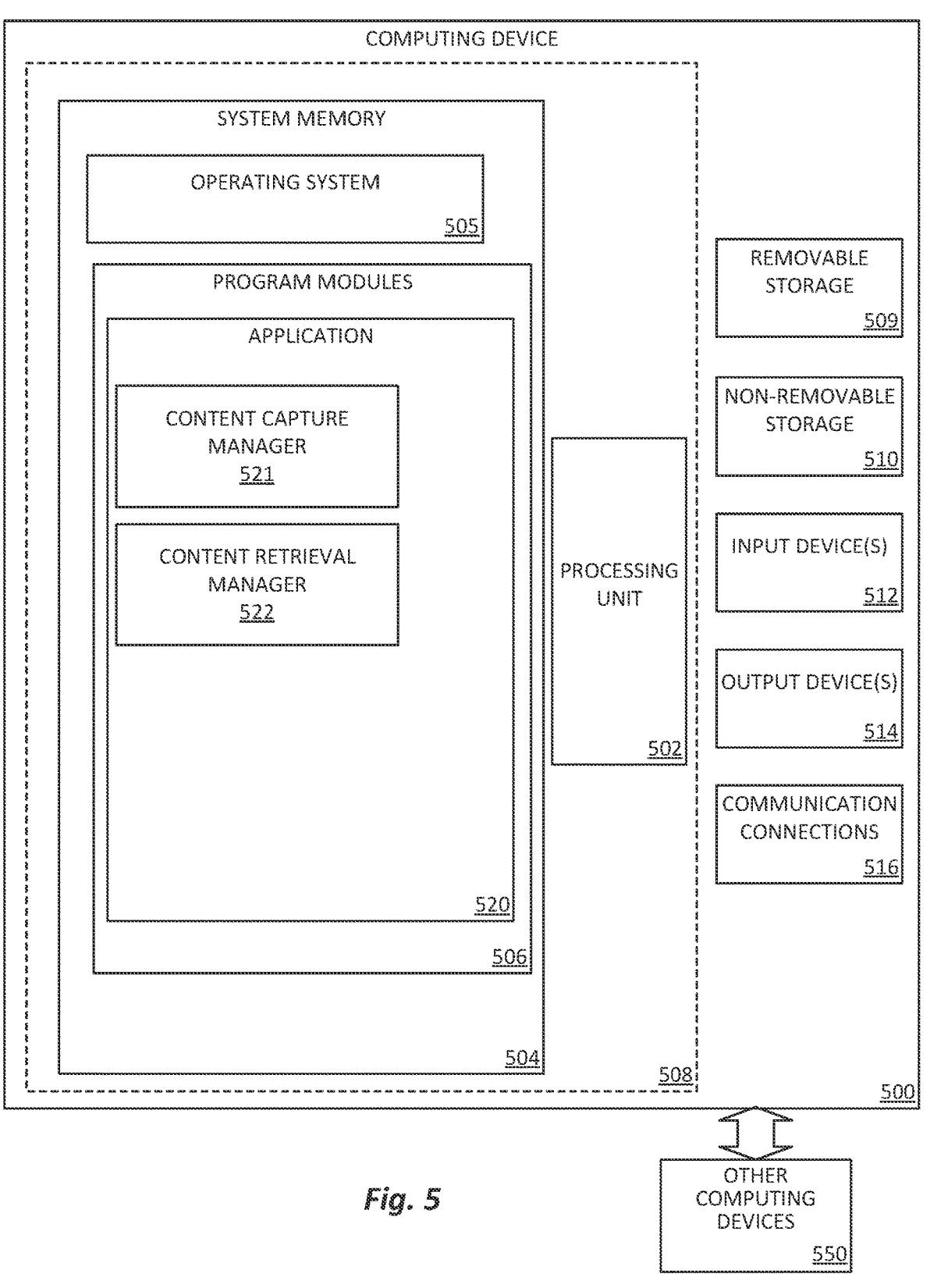
FIG. 5 is a block diagram illustrating example physical components of a computing device with which aspects of the disclosure may be practiced.
Figure 6:
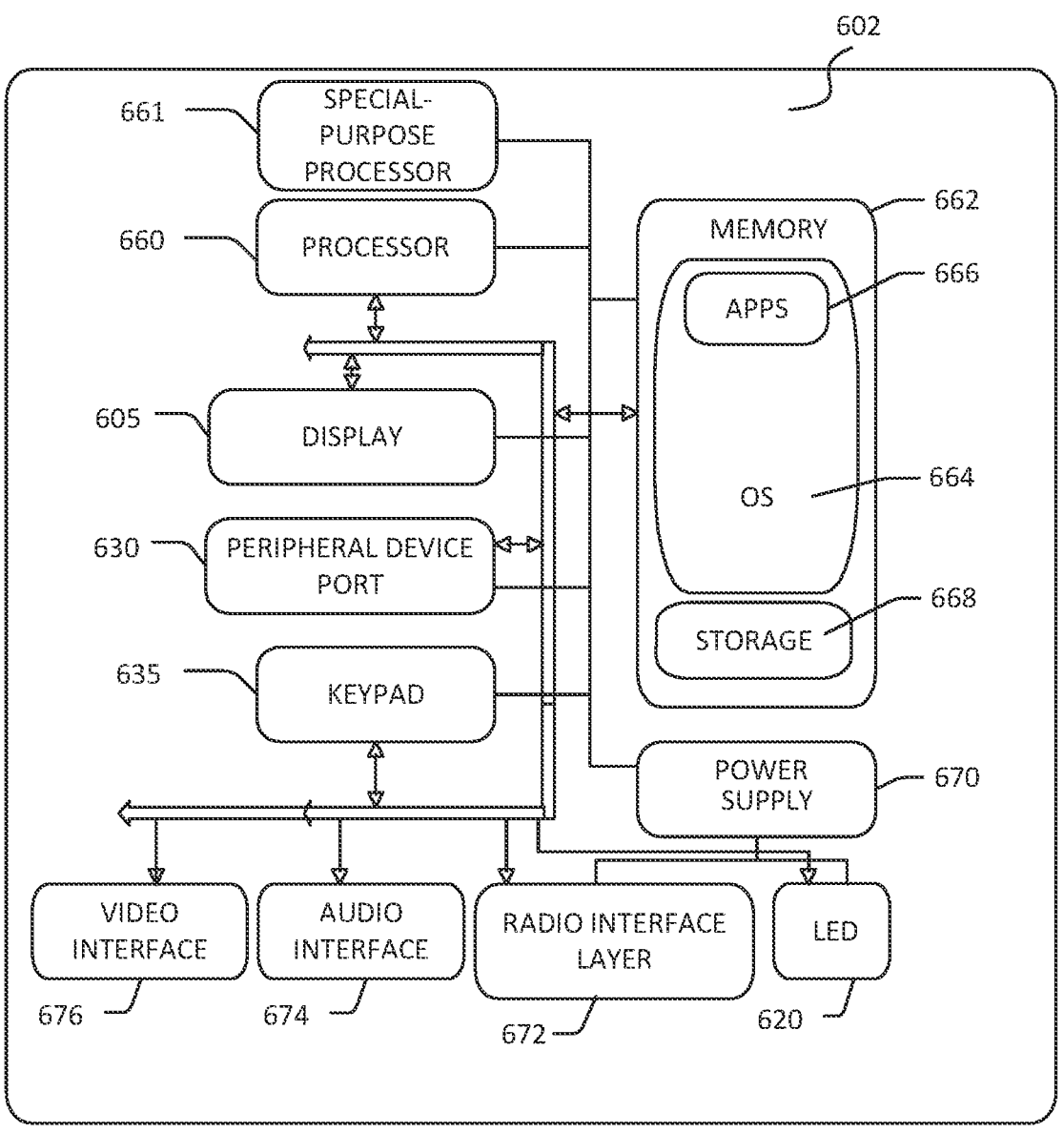
FIG. 6 is a simplified block diagram of a computing device with which aspects of the present disclosure may be practiced.
Figure 7:
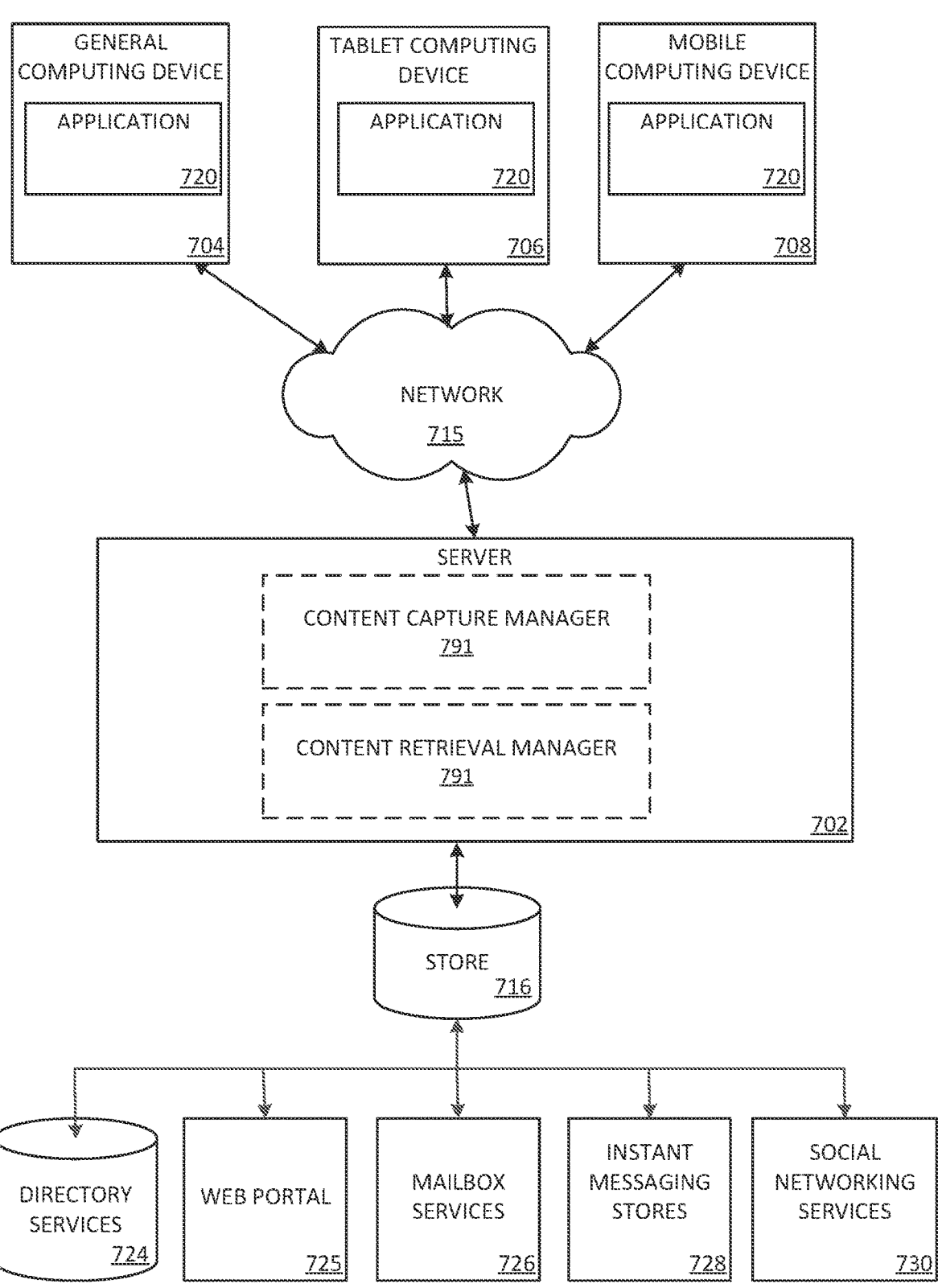
FIG. 7 is a simplified block diagram of a distributed computing system in which aspects of the present disclosure may be practiced.

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, described herein.

FIG. 5 is a block diagram illustrating physical components (e.g., hardware) of a computing device 500 with which aspects of the disclosure may be practiced. The computing device components described below may be suitable for the computing devices described above, including one or more devices associated with machine learning service (e.g., productive platform server 160), as well as computing device 140 discussed above with respect to FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store a content capture manager 521 and/or a content retrieval manager 522. The operating system 505, for example, may be suitable for controlling the operation of the computing device 500.

Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 6 illustrates a system 600 that may, for example, be a mobile computing device, such as a mobile telephone, a smart phone, wearable computer (such as a smart watch), a tablet computer, a laptop computer, and the like, with which aspects of the disclosure may be practiced. In one example, the system 600 is implemented as a "smart phone" capable of running one or more applications (e.g., browser, e-mail, calendaring, contact managers, messaging clients, games, and media clients/players). In some aspects, the system 600 is integrated as a computing device, such as an integrated personal digital assistant (PDA) and wireless phone.

In a basic configuration, such a mobile computing device is a handheld computer having both input elements and output elements. The system 600 typically includes a display 605 and one or more input buttons that allow the user to enter information into the system 600. The display 605 may also function as an input device (e.g., a touch screen display).

If included, an optional side input element allows further user input. For example, the side input element may be a rotary switch, a button, or any other type of manual input element. In alternative aspects, system 600 may incorporate more or less input elements. For example, the display 605 may not be a touch screen in some aspects. In another example, an optional keypad 635 may also be included, which may be a physical keypad or a "soft" keypad generated on the touch screen display.

In various aspects, the output elements include the display 605 for showing a graphical user interface (GUI), a visual indicator (e.g., a light emitting diode 620), and/or an audio transducer 625 (e.g., a speaker). In some aspects, a vibration transducer is included for providing the user with tactile feedback. In yet another aspect, input and/or output ports are included, such as an audio input (e.g., a microphone jack), an audio output (e.g., a headphone jack), and a video output (e.g., a HDMI port) for sending signals to or receiving signals from an external device.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 600 also includes a non-volatile storage area 668 within the memory 662. The non-volatile storage area 668 may be used to store persistent information that should not be lost if the system 600 is powered down. The application programs 666 may use and store information in the non-volatile storage area 668, such as e-mail or other messages used by an e-mail application, and the like. A synchronization application (not shown) also resides on the system 600 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the system 600 described herein (e.g., a content capture manager, a content retrieval manager, etc.).

The system 600 has a power supply 670, which may be implemented as one or more batteries. The power supply 670 might further include an external power source, such as an AC adapter or a powered docking cradle that supplements or recharges the batteries.

The system 600 may also include a radio interface layer 672 that performs the function of transmitting and receiving radio frequency communications. The radio interface layer 672 facilitates wireless connectivity between the system 600 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 600 may further include a video interface 676 that enables an operation of an on-board camera 630 to record still images, video stream, and the like.

It will be appreciated that system 600 may have additional features or functionality. For example, system 600 may also include additional data storage devices (removable and/or non-removable) such as, magnetic disks, optical disks, or tape. Such additional storage is illustrated in FIG. 6 by the non-volatile storage area 668.

Data/information generated or captured and stored via the system 600 may be stored locally, as described above, or the data may be stored on any number of storage media that may be accessed by the device via the radio interface layer 672 or via a wired connection between the system 600 and a separate computing device associated with the system 600, for example, a server computer in a distributed computing network, such as the Internet. As should be appreciated, such data/information may be accessed via the radio interface layer 672 or via a distributed computing network. Similarly, such data/information may be readily transferred between computing devices for storage and use according to any of a variety of data/information transfer and storage means, including electronic mail and collaborative data/information sharing systems.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 724, a web portal 725, a mailbox service 726, an instant messaging store 728, or a social networking site 730.

An application 720 (e.g., similar to the application 520) may be employed by a client that communicates with server device 702. Additionally, or alternatively, a content capture manager 791 and/or a content retrieval manger 792 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these examples of the computing devices may obtain content from the store 716, in addition to receiving graphical data useable to be either pre-processed at a graphic-originating system, or post-processed at a receiving computing system.

It will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera)

functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The example systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the example aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Example hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for capturing content items into a content database is provided. The method may include receiving a capture request to capture a content item, capturing the content item with metadata associated with the content item and generating one or more semantic embeddings of content data using one or more semantic models. The content data may include the content item and the metadata. The method may further include storing the one or more semantic embeddings in a content database and providing captured content history stored in the content database. The capture content history may include a list of captured content items. The method may further include receiving a user query to search the captured content history and providing search results based on the user query.

In accordance with at least one aspect of the above method, the method may include determining if an action associated with the content item exists based on the content data, and in response to determining that the action exists, performing the action associated with the content item.

In accordance with at least one aspect of the above method, the method may include where the content item includes one or more texts, documents, images, pictures, photos, videos, or audios.

In accordance with at least one aspect of the above method, the method may include where the metadata includes a date and time when the content item was captured, a type of the captured content item, a file name and a path of a file associated with the captured content item, a computing device used to capture the content item, a location of the computing device where the content item was captured, an application used to capture the content item, and any information extracted from the content item.

In accordance with at least one aspect of the above method, the method may include where the user query is a natural language query.

In accordance with at least one aspect of the above method, the method may include where providing the search results based on the user query includes generating an input embedding based on the user query, and retrieving semantic embeddings associated with one or more previously captured content items from the content database based on the similarity to the input embedding.

In accordance with at least one aspect of the above method, the method may further include filtering the search results based on the content data associated with content items in the search results.

In accordance with at least one aspect of the above method, the method may include where the one or more semantic models includes a generative large language model (LLM).

In accordance with at least one example of the present disclosure, a computing device for generating a design difference caption is provided. The computing device may include a processor and a memory having a plurality of instructions stored thereon that, when executed by the processor, causes the computing device to receive a capture request to capture a content item, capture the content item with metadata associated with the content item, generate one or more semantic embeddings of content data using one or more semantic models, the content data including the content item and the metadata, store the one or more semantic embeddings in a content database, provide captured content history stored in the content database, the capture content history including a list of captured content items, receive a user query to search the captured content history, and provide search results based on the user query.

In accordance with at least one aspect of the above computing device, the computing device may include the plurality of instructions, when executed, further cause the computing device to determine if an action associated with the content item exists based on the content data, and in response to the determination that the action exists, perform the action associated with the content item.

In accordance with at least one aspect of the above computing device, the computing device may include where the content item includes one or more texts, documents, images, pictures, photos, videos, or audios.

In accordance with at least one aspect of the above computing device, the computing device may include where the metadata includes a date and time when the content item was captured, a file name and a path of a file associated with the captured content item, a computing device used to capture the content item, a location of the computing device where the content item was captured, an application used to capture the content item, and any information extracted from the content item.

In accordance with at least one aspect of the above computing device, the computing device may include where to provide the search results based on the user query includes to generate an input embedding based on the user query, and retrieve semantic embeddings associated with one or more previously captured content items from the content database based on the similarity to the input embedding.

In accordance with at least one aspect of the above computing device, the computing device may include the plurality of instructions, when executed, further cause the computing device to filter the search results based on the content data associated with content items in the search results.

In accordance with at least one aspect of the above computing device, the computing device may include where the one or more semantic models includes a generative large language model (LLM).

In accordance with at least one example of the present disclosure, a non-transitory computer-readable medium storing instructions for generating a design difference caption is provided. The instructions when executed by one or more processors of a computing device, cause the computing device to receive a capture request to capture a content item, capture the content item with metadata associated with the content item, generate one or more semantic embeddings of content data using one or more semantic models, the content data including the content item and the metadata, store the one or more semantic embeddings in a content database, provide captured content history stored in the content database, the capture content history including a list of captured content items, receive a user query to search the captured content history, and provide search results based on the user query.

In accordance with at least one aspect of the above non-transitory computer-readable medium, the instructions when executed by the one or more processors may further cause the computing device to determine if an action associated with the content item exists based on the content data, and in response to the determination that the action exists, perform the action associated with the content item.

In accordance with at least one aspect of the above non-transitory computer-readable medium, the instructions when executed by one or more processors of a computing device may include where the content item includes one or more texts, documents, images, pictures, photos, videos, or audios, and wherein the metadata includes a date and time when the content item was captured, a file name and a path of a file associated with the captured content item, a computing device used to capture the content item, a location of the computing device where the content item was captured, an application used to capture the content item, and any information extracted from the content item.

In accordance with at least one aspect of the above non-transitory computer-readable medium, the instructions when executed by one or more processors of a computing device may include where to provide the search results based on the user query includes to generate an input embedding based on the user query, and retrieve semantic embeddings associated with one or more previously captured content items from the content database based on the similarity to the input embedding.

In accordance with at least one aspect of the above non-transitory computer-readable medium, the instructions when executed by the one or more processors may further cause the computing device to filter the search results based on the content data associated with content items in the search results.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for capturing content items into a content database, the method comprising:
   receiving a capture request to capture a plurality of content items, the plurality of content items including a first content item of a first content type and a second content item of a second content type, wherein the first content type is different than the second content type;
   capturing the plurality of content items with metadata associated with the plurality of content items;
   generating a plurality of semantic embeddings of the plurality of content items and the metadata, using one or more semantic models, the plurality of semantic embeddings including a first semantic embedding generated based on the first content item of the first content type and a second semantic embedding generated based on the second content item of the second content type;
   storing the plurality of semantic embeddings in the content database;
   providing captured content history stored in the content database, the captured content history including a list of captured content items;
   receiving a user query to search the captured content history;
   providing search results based on a semantic measure between the plurality of semantic embeddings in the content database and the user query;
   determining if an action associated with one or more of the plurality of content items exists based on the metadata; and
   in response to determining that the action exists, performing the action associated with the one or more of the plurality of content items.

2. The method of claim 1, wherein the plurality of content items includes one or more texts, documents, images, pictures, photos, videos, or audios.

3. The method of claim 1, wherein the metadata for one or more content items of the plurality of content items includes a date and time when the one or more content items was captured, a type of the one or more captured content items, a file name and a path of a file associated with the one or more captured content items, a computing device used to capture the one or more content items, a location of the computing device where the one or more content items was captured, an application used to capture the one or more content items, and any information extracted from the one or more content items.

4. The method of claim 1, wherein the user query is a natural language query.

5. The method of claim 1, wherein providing the search results based on the user query includes:
   generating an input embedding based on the user query; and
   retrieving semantic embeddings associated with one or more previously captured content items from the content database based on a similarity to the input embedding.

6. The method of claim 1, further comprising filtering the search results based on the metadata associated with content items in the search results.

7. The method of claim 1, wherein the one or more semantic models includes a generative large language model (LLM).

8. A computing device for generating a design difference caption, the computing device comprising:
   a processor; and
   a memory having a plurality of instructions stored thereon that, when executed by the processor, causes the computing device to:
   receive a capture request to capture a plurality of content items, the plurality of content items including a first content item of a first content type and a second content item of a second content type, wherein the first content type is different than the second content type;
   capture the plurality of content items with metadata associated with the plurality of content items;
   generate a plurality of semantic embeddings of the plurality of content items and the metadata, using one or more semantic models, the plurality of semantic embeddings including a first semantic embedding generated based on the first content item and a second semantic embedding generated based on the second content item;
   store the plurality of semantic embeddings in a content database;
   provide captured content history stored in the content database, the captured content history including a list of captured content items;
   receive a user query to search the captured content history;
   provide search results based on a semantic measure between the plurality of semantic embeddings in the content database and the user query;
   determine if an action associated with one or more of the plurality of content items exists based on the metadata; and
   in response to determining that the action exists, perform the action associated with the one or more of the plurality of content items.

9. The computing device of claim 8, wherein the plurality of content items includes one or more texts, documents, images, pictures, photos, videos, or audios.

10. The computing device of claim 8, wherein the metadata for one or more content items of the plurality of content items includes a date and time when the one or more content items was captured, a type of the one or more captured content items, a file name and a path of a file associated with the one or more captured content items, a source computing device used to capture the one or more content items, a location of the computing device where the one or more content items was captured, an application used to capture the one or more content items, and any information extracted from the one or more content items.

11. The computing device of claim 8, wherein to provide the search results based on the user query includes to:

generate an input embedding based on the user query; and retrieve semantic embeddings associated with one or more previously captured content items from the content database based on a similarity to the input embedding.

12. The computing device of claim 8, wherein the plurality of instructions, when executed, further cause the computing device to filter the search results based on the metadata associated with content items in the search results.

13. The computing device of claim 8, wherein the one or more semantic models includes a generative large language model (LLM).

14. A non-transitory computer-readable medium storing instructions for generating a design difference caption, the instructions when executed by one or more processors of a computing device, cause the computing device to:

receive a capture request to capture a plurality of content items, the plurality of content items including a first content item of a first content type and a second content item of a second content type, wherein the first content type is different than the second content type;

capture the plurality of content items with metadata associated with the plurality of content items;

generate a plurality of semantic embeddings of the plurality of content items and the metadata, using one or more semantic models, the plurality of semantic embeddings including a first semantic embedding generated based on the first content item and a second semantic embedding generated based on the second content item;

store the plurality of semantic embeddings in a content database;

provide captured content history stored in the content database, the captured content history including a list of captured content items;

receive a user query to search the captured content history;

provide search results based on a semantic measure between the plurality of semantic embeddings in the content database and the user query;

determine if an action associated with one or more of the plurality of content items exists based on the metadata; and in response to determining that the action exists, perform the action associated with the one or more of the plurality of content items.

15. The non-transitory computer-readable medium of claim 14, wherein the plurality of content items includes one or more texts, documents, images, pictures, photos, videos, or audios, and wherein the metadata for one or more content items of the plurality of content items includes a date and time when the one or more content items was captured, a type of the one or more captured content items, a file name and a path of a file associated with the one or more captured content items, a source computing device used to capture the one or more content items, a location of the computing device where the one or more content items was captured, an application used to capture the one or more content items, and any information extracted from the one or more content items.

16. The non-transitory computer-readable medium of claim 14, wherein to provide the search results based on the user query includes to:

generate an input embedding based on the user query; and retrieve semantic embeddings associated with one or more previously captured content items from the content database based on a similarity to the input embedding.

17. The non-transitory computer-readable medium of claim 14, wherein the instructions, when executed, further cause the computing device to filter the search results based on the metadata associated with content items in the search results.

* * * * *